(12) United States Patent
Yinbal

(10) Patent No.: US 6,424,952 B1
(45) Date of Patent: Jul. 23, 2002

(54) METHOD OF PROVIDING MEANS TO PAY FOR TOTAL FUTURE EDUCATIONAL EXPENSES TO ATTEND AN INSTITUTION OF HIGHER LEARNING

(75) Inventor: Alazar Yinbal, Studio City, CA (US)

(73) Assignee: EDLife Holding Ltd., Hamilton (BM)

( * ) Notice: Subject to any disclaimer, the term of this patent is extended or adjusted under 35 U.S.C. 154(b) by 0 days.

(21) Appl. No.: 09/353,003

(22) Filed: Jul. 13, 1999

(51) Int. Cl.⁷ .............................................. G06F 17/60
(52) U.S. Cl. ............................................ 705/36; 705/4
(58) Field of Search ............................. 705/1, 4, 39, 36

(56) References Cited

U.S. PATENT DOCUMENTS

| | | | | | |
|---|---|---|---|---|---|
| 4,642,768 A | * | 2/1987 | Roberts | ........................ | 705/35 |
| 4,752,877 A | * | 6/1988 | Roberts et al. | ................ | 705/35 |
| 4,787,036 A | * | 11/1988 | Fleming | ........................ | 705/10 |
| 5,745,885 A | * | 4/1998 | Mottola et al. | ................ | 705/36 |
| 5,884,287 A | * | 3/1999 | Edesess | ........................ | 705/36 |
| 5,987,433 A | * | 11/1999 | Crapo | ........................... | 705/36 |
| 6,064,984 A | * | 5/2000 | Ferguson et al. | .............. | 705/36 |

OTHER PUBLICATIONS http://www.vpep.state.va.us/vpep_2.html. Virginia Prepaid Education Program. Downloaded Mar. 13, 2001.*
http://www.vpep.state.va.us/vpep_13.html. Virginia Prepaid Education Program. Downloaded Mar. 13, 2001.*
Virginia Acts of Assembly 1998 Session. Chapter 85 [H 589]. Approved Mar. 13, 1998.*
Virginia Acts of Assembly 1998 Session. Chapter 61 [S 267]. Approved Mar. 13, 1998.*
http://www.get.wa.gov/faq.htm. Washington State College Tuition Prepaid Program—Guaranteed Education Tuition (GET). Downloaded Mar. 13, 2001.*
http://www.vpep.state.va.us/vpep_home.html. Virginia Prepaid Education Program. Downloaded Mar. 13, 2001.*
http://www.vpep.state.va.us/vpep_3.html. Virginia Prepaid Education Program. Downloaded Mar. 13, 2001.*
Dictionary of Finance and Investment Terms. Barron's Educational Series, Inc. 1998. pp. 282–283.*
Gore, Jennifer P; "Software Puts a Certified Financial Planner in a PC"; Bank Marketing; Dec. 1996.*
Stewart, Barbara; "She'll Get You In"; The New York Times; Mar. 3, 1996.*
Anonymous; "The Spin Doctors of Admissions"; Time; Dec. 19, 1988.*

* cited by examiner

*Primary Examiner*—Kyle J. Choi
(74) *Attorney, Agent, or Firm*—Thomas I. Rozsa; Tony D. Chen (57) ABSTRACT

A method and system for financing expected future educational expenses. The method includes the basic steps of determining current educational expenses, reviewing past changes in educational expenses, calculating future educational expenses based on current educational expenses, past changes in educational expenses and assumptions on annual increase rates of educational expenses, establishing a target for future total investment payout based on calculated total future educational expenses and assumptions on expected investment yields, and deriving present investment amount needed to provide future educational expenses. Payment of the investment amounts are collected for investment of future payment of educational expenses. Additional insurance policies are purchased to providing cushion money to cover investment short fall and guarantee the payment for future education expenses. The system that implements the present invention method utilizes a computer network such as the Internet for establishing and maintaining a web site which provides on-line enrollment of the service and direct payment links as well as continued educational counseling.

32 Claims, 3 Drawing Sheets

METHOD OF PROVIDING MEANS TO PAY FOR TOTAL FUTURE EDUCATIONAL EXPENSES TO ATTEND AN INSTITUTION OF HIGHER LEARNING

BACKGROUND OF THE INVENTION

The present invention generally relates to the field of financial services related to educational expenses. More particularly, the present invention relates to the field of providing higher education related financial services aided by computer networks such as the Internet.

DESCRIPTION OF THE PRIOR ART

The expenses and costs related to higher education in the United States are sky rocketing. Many parents begin saving money for their children's future higher education costs. However, it is hard to determine how much money needs to be saved now, because providing funds for future educational costs involves numerous uncertainties and risks, such as the future costs of higher education for the schools desired, the potential future rates of return for money saved and/or invested, and present values of the future costs under various assumptions.

There remains a need to eliminate the risks associated with the inflation in educational costs encountered by families with children desiring future higher education, and to provide assistance in the complicated process of successfully selecting and being admitted to the proper higher education institution.

SUMMARY OF THE INVENTION

The present invention is a method and system for financing expected future educational expenses.

A primary object of the present invention is to guarantee for children under the age of eight (8), the future delivery of educational costs and expenses at a college or university of their choice in the United States. A related object of the present invention is to provide ongoing counseling and guidance relative to the general admissions process at these institutions.

The present invention method considers: (1) expected future costs of higher education in the United States at some of the most highly rated institutions; (2) potential future rates of return appropriate for use in developing present values of future educational expenses, using historical experience as a guide; and (3) sample present values, under various assumptions, of amounts necessary today to meet future educational requirements.

It is also an object of the present invention to introduce to the worldwide market of parents and grandparents an innovative and unique package of financial savings program for higher education in the United States, together with educational counseling, guaranteeing full payment for most prestigious universities in the United States, and an ongoing online educational counseling. Families will invest amounts smaller than today's cost with reputable investment management firms in the United States and receive a contract or policy that promises a full and direct payment to any college in the United States chosen by their children in the future.

It is another object of the present invention to provide a method and system for providing on-line assistance for educational funding and counseling services by utilizing a computer network such as the Internet. Described generally, the present invention is a method and system for financing expected future educational expenses. The method includes the basic steps of determining current educational expenses, reviewing past changes in educational expenses, calculating future educational expenses based on current educational expenses, past changes in educational expenses and assumptions on annual increase rates of educational expenses, establishing a target for future investment return based on calculated actuarial future educational expenses and assumptions on expected investment yields, and deriving present investment amounts needed to provide future educational expenses. Payment of the investment amounts are collected for investment of future payment of educational expenses. Additional insurance policies are purchased to providing cushion money to cover investment short fall and guarantee the payment for future educational expenses.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention method includes the steps of estimating the magnitude of future costs and obtaining an appropriate yield on current dollars in order to provide the future funding. An additional consideration is that the current funding must be sufficient to provide for operational costs and other expenses related to the fund management and custodial responsibilities.

Figure 1:
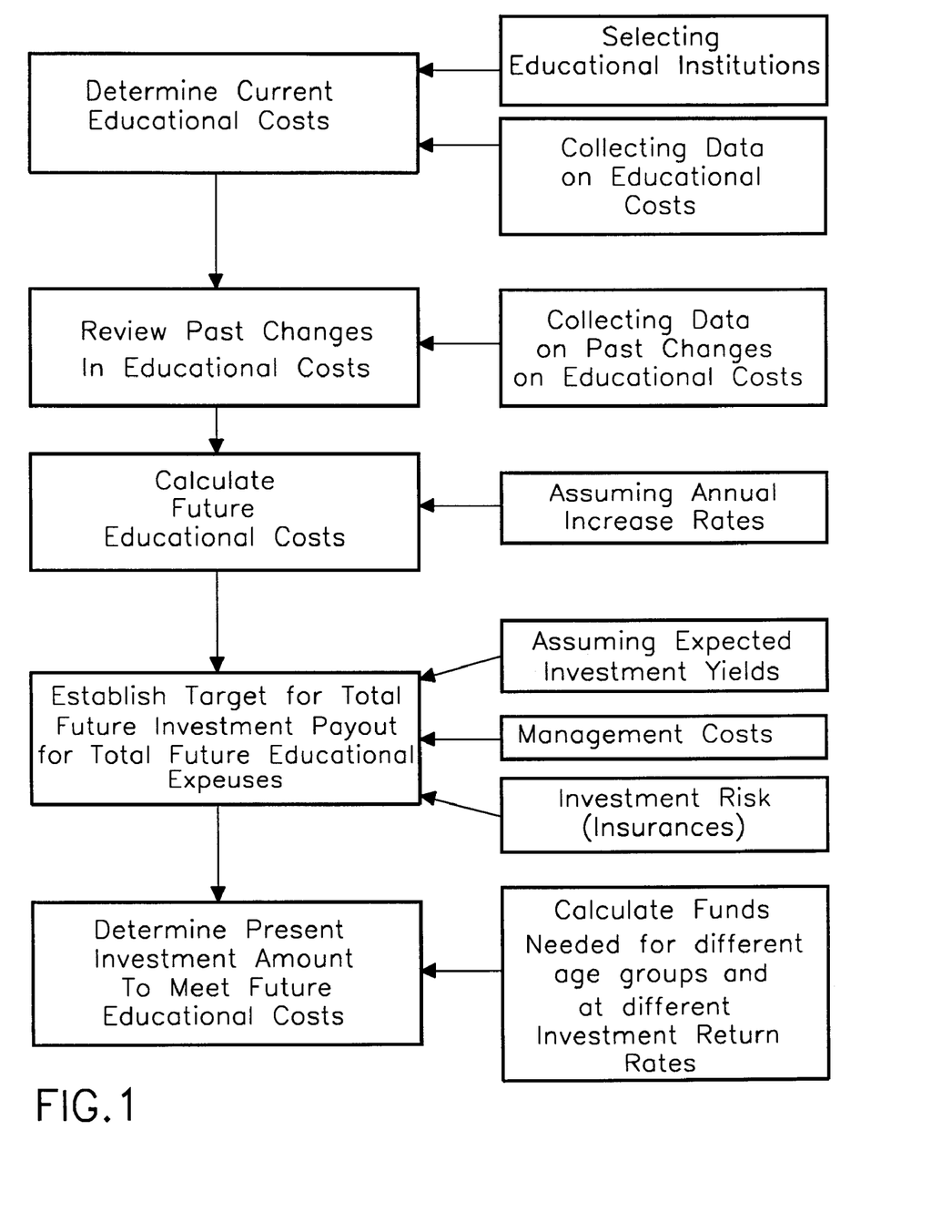
FIG. 1 is a flow chart illustrating a preferred embodiment of the present invention method for financing expected future educational expenses.

Referring to FIG. 1, the first important step of the present invention method is to determine current costs for selected institutions and review how educational costs have changed in the past, which may be used to estimate how such costs might increase in the future.

As an example, the present invention method has assembled a group of "selected institutions", based on the 1999 "Best College" edition of *U.S. News & World Report*. From this publication, which rates the "best" undergraduate institutions on national and regional bases each year, twenty-five (25) most highly rated national universities, as shown in TABLE I-A, and ten (10) most highly rated national liberal arts colleges were selected, as shown in TABLE I-B. These institutions are believed to have certainly met the criteria of being among the most highly regarded institutions in the United States.

TABLE I-A

Twenty-five (25) Top Rated National Universities

Harvard University
Princeton University
Yale University
Massachusetts Institute of Technology
Stanford University
Cornell University
Duke University
University of Pennsylvania
California Institute of Technology
Brown University
Columbia University
Dartmouth University
Northwestern University
Johns Hopkins University
University of Chicago
Emory University
Washington University
Rice University
University of Notre Dame
Georgetown University
Vanderbilt University
University of California - Berkeley
University of Virginia
University of North Carolina - Chapel Hill
Carnegie Mellon University

TABLE I-B

Ten (10) Top Rated Liberal Arts Colleges

Amherst College
Swarthmore College
Williams College
Wellesley College
Haverford College
Pomona College
Bowdoin College
Middlebury College
Carleton College
Wesleyan College Having chosen the institutions to be included in the example of the present invention method, the current (1998–1999 school year, if available) cost information were summarized, taking data from the following sources: (1) *U.S. News & World Report*—1999 "Best Colleges" edition; (2) *Time/The Princeton Review*—1999 "The Best College for You" edition; and (3) *Newsweek/Kaplan*—1999 "How to Get into College" edition.

Each of these publications provides cost information such as tuition, room and board, fees, and books. Since not all cost categories were available for every institution, to arrive at the final "current cost", the greatest combination of tuition/room and board/fees from either the *U.S. News and World Report* or *Newsweek/Kaplan* publications was picked, and the book charges shown in the *Time/Princeton Review* publication were added thereon. The resulting current costs for each institution are shown in TABLE II-A and TABLE II-B.

The following are the average current costs for the two groups of institutions:

| Institution Grouping | Average Current Annual Educational Costs |
|---|---|
| 25 National Universities | $29,072 |
| 10 Liberal Arts Colleges | $30,758 |

The next step is to evaluate how educational costs have changed in the past. As an example of the present invention method, the data provided by The College Board in New York was reviewed. Their material ("Trends in College Pricing") provides the average tuition and fees for two and four year, private and public institutions in the United States from 1971 to the present. Room and board costs were also available from 1988 to 1999. Additionally, the 1972–1999 tuition and fees amounts were shown on both a current dollar and an inflation adjusted constant dollar basis.

The College Board information is summarized in TABLE III.

TABLE II-A

| Current Educational Costs for Selected National Universities | |
|---|---|
| Harvard University | $31,932 |
| Princeton University | 30,531 |
| Yale University | 33,230 |
| Massachusetts Institute of Technology | 31,750 |
| Stanford University | 30,899 |
| Cornell University | 30,978 |
| Duke University | 31,562 |
| University of Pennsylvania | 31,634 |
| California Institute of Technology | 25,905 |
| Brown University | 31,060 |
| Columbia University | 32,272 |
| Dartmouth University | 31,512 |
| Northwest University | 31,004 |
| Johns Hopkins University | 30,855 |
| University of Chicago | 31,810 |
| Emory University | 29,930 |
| Washington University | 30,171 |
| Rice University | 21,111 |
| University of Notre Dame | 27,300 |
| Georgetown University | 31,712 |
| Vanderbilt University | 31,000 |
| University of California - Berkeley | 22,170 |
| University of Virginia | 20,935 |
| University of North Carolina - Chapel Hill | 16,761 |
| Carnegie Mellon University | 28,780 |

TABLE II-B

| Current Educational Costs for Selected Liberal Art Colleges | |
|---|---|
| Amherst College | $31,232 |
| Swarthmore College | 31,540 |
| Williams College | 31,900 |
| Wellesley College | 30,120 |
| Haverford College | 31,010 |
| Pomona College | 30,720 |
| Bowdoin College | 30,860 |
| Middlebury College | 31,025 |
| Carleton College | 27,195 |
| Wesleyan College | 31,980 |

TABLE III

Average Tuition and Fees for Private Four-Year Institutions

| Academic | Current Dollars | | Constant Dollars | |
|---|---|---|---|---|
| Year Ending | Amount ($) | Increase (%) | Amount ($) | Increase (%) |
| 1972 | 1,820 | — | 7,218 | — |
| 1973 | 1,898 | 4.3 | 7,236 | .2 |
| 1974 | 1,989 | 4.8 | 6,962 | (3.8) |
| 1975 | 2,117 | 6.4 | 6,671 | (4.2) |
| 1976 | 2,272 | 7.3 | 6,686 | .2 |
| 1977 | 2,534 | 11.5 | 7,046 | 5.4 |
| 1978 | 2,700 | 6.6 | 7,035 | (.2) |
| 1979 | 2,958 | 9.6 | 7,047 | .2 |
| 1980 | 3,225 | 9.0 | 6,780 | (3.8) |
| 1981 | 3,617 | 12.2 | 6,814 | .5 |
| 1982 | 4,113 | 13.7 | 7,133 | 4.7 |
| 1983 | 4,639 | 12.8 | 7,714 | 8.1 |
| 1984 | 5,093 | 9.8 | 8,166 | 5.9 |
| 1985 | 5,556 | 9.1 | 8,573 | 5.0 |
| 1986 | 6,121 | 10.2 | 9,180 | 7.1 |
| 1987 | 6,658 | 8.8 | 9,769 | 6.4 |
| 1988 | 7,048 | 5.9 | 9,929 | 1.6 |
| 1989 | 8,004 | 13.6 | 10,778 | 8.6 |
| 1990 | 8,663 | 8.2 | 11,134 | 3.3 |
| 1991 | 9,340 | 7.8 | 11,382 | 2.2 |
| 1992 | 9,872 | 5.7 | 11,586 | 1.8 |
| 1993 | 10,449 | 5.8 | 11,965 | 3.3 |
| 1994 | 11,007 | 5.3 | 12,285 | 2.7 |
| 1995 | 11.719 | 6.5 | 12,716 | 3.5 |
| 1996 | 12,216 | 4.2 | 12,904 | 1.5 |
| 1997 | 12,994 | 6.4 | 13,345 | 3.4 |
| 1998 | 13,785 | 6.1 | 13,909 | 4.2 |
| 1999 | 14,508 | 5.2 | 14,508 | 4.3 |

According to the College Board material, the annual average increase in tuition and fees since 1972 has been 8.0%. Since 1988, the average annual tuition and fees increase has been 6.1%, while the comparable increase for room and board charges during that same period was 5.4%. On a year by year basis, the annual room and board increase is consistently 1%–3% lower than the tuition and fees change in the same year. On a "constant dollar" basis, using 1972 as a starting point, the average annual increase in tuition and fees has been about 2.6%.

The tuition and fees cost increases mentioned above, 6.1% and 2.6%, are measured over nearly a thirty year period. Within that span of years, there were substantial changes in cost, both positive and negative. Shown in TABLE IV is a comparison of the annual cost increases with the annual change in the Consumer Price Index (CPI). Although the values do not match exactly, there is a strong correlation between the way educational costs change versus the inflation rate.

The next step of the present invention method is to calculate examples of future costs based on several assumed annual increase rates, using the current educational costs described earlier as a starting point. These values are accumulations of the current costs compounded at the rates shown. The detailed results of the calculations are shown in TABLE V. The summarized results of the calculation are shown in TABLE V-A and TABLE V-B (based on 1999 costs of $29,072 for National Universities and $30,758 for Liberal Arts Colleges).

The next step of the present invention method is to establish a target for future expected investment yields. Future investment yields are crucial to the present invention method because enough return must be generated from the initial investment to provide for the future increase in educational expenses as well as covering applicable investment management and risk charges, and certain expenses. The required investment return may follow the trend of educational costs. The investment management must look for returns which will provide the margin to cover the items discussed above, at an appropriate level of risk for the situation.

TABLE IV

Relationship of Historic Tuition and Fees Increases to CPI Changes

| Year | Increase in Educational Costs | CPI Rate of Inflation | Difference |
|---|---|---|---|
| 1973 | 4.3% | 6.2% | (1.9)% |
| 1974 | 4.8 | 11.0 | (6.2) |
| 1975 | 6.4 | 9.1 | (2.7) |
| 1976 | 7.3 | 5.8 | 1.5 |
| 1977 | 11.5 | 6.5 | 5.0 |
| 1978 | 6.6 | 7.6 | (1.0) |
| 1979 | 9.6 | 11.3 | (1.7) |
| 1980 | 9.0 | 13.5 | (4.5) |
| 1981 | 12.2 | 10.3 | 1.9 |
| 1982 | 13.7 | 6.2 | 7.5 |
| 1983 | 12.8 | 3.2 | 9.6 |
| 1984 | 9.8 | 4.3 | 5.5 |
| 1985 | 9.1 | 3.6 | 5.5 |
| 1986 | 10.2 | 1.9 | 8.3 |
| 1987 | 8.8 | 3.6 | 5.2 |
| 1988 | 5.9 | 4.1 | 1.8 |
| 1989 | 13.6 | 4.8 | 8.8 |
| 1990 | 8.2 | 5.4 | 2.8 |
| 1991 | 7.8 | 4.2 | 3.6 |
| 1992 | 5.7 | 3.0 | 2.7 |
| 1993 | 5.8 | 3.0 | 2.8 |
| 1994 | 5.3 | 2.6 | 2.7 |
| 1995 | 6.5 | 2.8 | 3.7 |
| 1996 | 4.2 | 2.9 | 1.3 |
| 1997 | 6.4 | 2.4 | 4.0 |
| 1998 | 6.1 | 1.6 | 4.5 |
| Average Increase | 8.1% | 5.4% | 2.7% |

TABLE V

Projected Future Educational Costs at Various Annual Rates of Increase

| Number of Years | National Universities | | | Liberal Art Colleges | | |
|---|---|---|---|---|---|---|
| | 5% | 6% | 7% | 5% | 6% | 7% |
| 10 | $47,355 | $52,064 | $62,764 | $50,102 | $55,083 | $66,404 |
| 11 | 49,723 | 55,187 | 67,785 | 52,607 | 58,388 | 71,717 |
| 12 | 52,209 | 58,499 | 73,208 | 55,237 | 61,891 | 77,454 |
| 13 | 54,820 | 62,008 | 79,065 | 57,999 | 65,605 | 83,650 |
| 14 | 57,561 | 65,729 | 85,390 | 60,899 | 69,541 | 90,342 |
| 15 | 60,439 | 69,673 | 92,221 | 63,944 | 73,713 | 97,570 |
| 16 | 63,461 | 73,853 | 99,599 | 67,141 | 78,136 | 105,375 |
| 17 | 66,634 | 78,284 | 107,567 | 70,498 | 82,824 | 113,805 |
| 18 | 69,965 | 82,981 | 116,172 | 74,023 | 87,794 | 122,910 |
| 19 | 73,463 | 87,960 | 125,466 | 77,724 | 93,061 | 132,742 |
| 20 | 77,137 | 93,328 | 135,503 | 81,610 | 98,645 | 143,362 |
| 21 | 80,994 | 98,832 | 146,344 | 85,691 | 104,564 | 154,831 |

TABLE V-A

Summary of Calculation Result for Selected National Universities

| Year Costs | Four Years of Educational Costs ($) at the Annual Rate of Increase (%) Shown | | |
|---|---|---|---|
| Begin | 5 | 6 | 8 |
| 2009 | 204,107 | 227,758 | 282,822 |
| 2013 | 248,095 | 287,539 | 384,777 |
| 2017 | 301,559 | 363,011 | 523,485 |

TABLE V-B

Summary of Calculation Result for Selected Liberal Arts Colleges

| Year Costs | Four Years of Educational Costs ($) at the Annual Rate of Increase (%) Shown | | |
|---|---|---|---|
| Begin | 5 | 6 | 8 |
| 2009 | 215,945 | 240,967 | 299,225 |
| 2013 | 262,482 | 304,214 | 407,092 |
| 2017 | 319,048 | 384,064 | 553,845 |

For example, assuming future educational costs will increase at a rate which is somewhat above inflation, for example, 2%, then an interesting comparison is the difference between the historic CPI and the annual rate for one year Treasury Bills. Such a comparison is shown in TABLE VI. Since 1960, the Treasury Bill has averaged about 1.5% above the CPI. During that period, however, there have been substantially greater margins in either direction. Using this crude comparison as a guide provides a certain idea of the additional risk to be borne by the investment management to increase yields to required levels.

The final step of the present invention method is to derive present amount needed for investment to meet future expected costs of higher education, i.e., to determine what amount is necessary today to meet the expected future costs of education. This determination depends upon several related factors, including but not limit to, the assumed future costs, and the expected yield rate associated with the initial invested funds.

As an example, TABLE VII shows the present value of four years of future educational costs, assuming annual cost increases of 5%, 6%, and 8%. The future costs have been discounted to the present value assuming a yield rate 2% higher than the assumed growth rate. Specific examples of funds needed for children at different present ages are shown in TABLE VII-A and TABLE VII-B.

These calculations do not reflect any assumptions relative to deaths prior to the payment periods. The present invention method also looked at present values assuming a death benefit equal to the initial "premium" with 4% annual interest paid if death occurs prior to age 18. It is determined that a benefit of this magnitude has very little impact on the present values, which indicates paying out funds earlier than anticipated is offset by the reduced "interest" allocated to those payments. Ultimately, any anticipated death benefit and potential "surrender" benefit must be specifically defined in order to reflect its impact on the pricing.

TABLE VI

Comparison of Historic CPI Rate and One-Year Treasury Bills (Secondary Market)

| Year | Treasury Rate | CPI Rate | Difference |
|---|---|---|---|
| 1960 | 4.95% | 1.70% | 3.25% |
| 1961 | 2.63% | 1.00% | 1.63% |
| 1962 | 3.19% | 1.00% | 2.19% |
| 1963 | 3.00% | 1.30% | 1.70% |
| 1964 | 3.68% | 1.30% | 2.38% |
| 1965 | 3.91% | 1.60% | 2.31% |
| 1966 | 4.69% | 2.90% | 1.79% |
| 1967 | 4.61% | 3.10% | 1.51% |
| 1968 | 5.30% | 4.20% | 1.10% |
| 1969 | 6.07% | 5.50% | 0.57% |
| 1970 | 7.51% | 5.70% | 1.81% |

TABLE VI-continued

Comparison of Historic CPI Rate and One-Year Treasury Bills (Secondary Market)

| Year | Treasury Rate | CPI Rate | Difference |
|---|---|---|---|
| 1971 | 4.40% | 4.40% | 0.00% |
| 1972 | 3.82% | 3.20% | 0.62% |
| 1973 | 5.58% | 6.20% | −0.62% |
| 1974 | 7.01% | 11.00% | −3.99% |
| 1975 | 6.27% | 9.10% | −2.83% |
| 1976 | 5.44% | 5.80% | −0.36% |
| 1977 | 5.00% | 6.50% | −1.50% |
| 1978 | 6.80% | 7.60% | −0.80% |
| 1979 | 9.54% | 11.30% | −1.76% |
| 1980 | 10.96% | 13.50% | −2.54% |
| 1981 | 12.62% | 10.30% | 2.32% |
| 1982 | 12.77% | 6.20% | 6.57% |
| 1983 | 8.01% | 3.20% | 4.81% |
| 1984 | 9.07% | 4.30% | 4.77% |
| 1985 | 8.33% | 3.60% | 4.73% |
| 1986 | 7.21% | 1.90% | 5.31% |
| 1987 | 5.46% | 3.60% | 1.86% |
| 1988 | 6.52% | 4.10% | 2.42% |
| 1989 | 8.37% | 4.80% | 3.57% |
| 1990 | 7.38% | 5.40% | 1.98% |
| 1991 | 6.25% | 4.20% | 2.05% |
| 1992 | 3.95% | 3.00% | 0.95% |
| 1993 | 3.35% | 3.00% | 0.35% |
| 1994 | 3.39% | 2.60% | 0.79% |
| 1995 | 6.59% | 2.80% | 3.79% |
| 1996 | 4.82% | 2.90% | 1.92% |
| 1997 | 5.30% | 2.405 | 2.90% |
| 1998 | 4.98% | 1.60% | 3.38% |
| 1999 | 4.31% | | |

TABLE VII

Present Value of Future Educational Costs for Four Years Beginning at Age 18

| Current Age | Future Cost Increase Rate | Discount Rate | National Universities | Liberal Art Colleges |
|---|---|---|---|---|
| 0 | 5% | 7% | $80,508 | $85,178 |
| 1 | | | 82,042 | 86,800 |
| 2 | | | 83,605 | 88,453 |
| 3 | | | 85,197 | 90,138 |
| 4 | | | 86,820 | 91,855 |
| 5 | | | 88,474 | 93,605 |
| 6 | | | 90,159 | 95,388 |
| 7 | | | 91,876 | 97,205 |
| 8 | | | 93,626 | 99,056 |
| 0 | 6% | 8% | $80,765 | $85,471 |
| 1 | | | 82,310 | 87,083 |
| 2 | | | 82,863 | 88,726 |
| 3 | | | 85,445 | 90,400 |
| 4 | | | 87,057 | 92,106 |
| 5 | | | 88,700 | 93,844 |
| 6 | | | 90,373 | 95,615 |
| 7 | | | 92,079 | 97,419 |
| 8 | | | 93,816 | 99,257 |
| 0 | 8% | 10% | $81,327 | $86,044 |
| 1 | | | 82,833 | 87,637 |
| 2 | | | 84,367 | 89,260 |
| 3 | | | 85,929 | 90,913 |
| 4 | | | 87,521 | 92,596 |
| 5 | | | 89,141 | 94,311 |
| 6 | | | 90,792 | 96,058 |
| 7 | | | 92,473 | 97,836 |
| 8 | | | 94,186 | 99,648 |

TABLE VII-A

Present Value of Future Costs of Selected National Universities

| Current Age | Future Cost Increase Rate (%) | Discount Rare (%) | Future Costs ($) for Four Years | Present Value ($) |
|---|---|---|---|---|
| 0 | 5 | 7 | 301,559 | 80,508 |
|   | 6 | 8 | 363,011 | 80,785 |
|   | 8 | 10 | 523,485 | 81,327 |
| 4 | 5 | 7 | 248,095 | 86.820 |
|   | 6 | 8 | 287,539 | 87,057 |
|   | 8 | 10 | 384,777 | 87,521 |
| 8 | 5 | 7 | 204,107 | 93,626 |
|   | 6 | 8 | 227,758 | 93,816 |
|   | 8 | 10 | 282,822 | 94,186 |

TABLE VII-B

Present Value of Future Costs of Selected Liberal Arts Colleges

| Current Age | Future Cost Increase Rate (%) | Discount Rare (%) | Future Costs ($) for Four Years | Present Value ($) |
|---|---|---|---|---|
| 0 | 5 | 7 | 319,048 | 85,178 |
|   | 6 | 8 | 384,064 | 85,471 |
|   | 8 | 10 | 553,845 | 86,044 |
| 4 | 5 | 7 | 262,482 | 91,855 |
|   | 6 | 8 | 304,214 | 92,106 |
|   | 8 | 10 | 407,092 | 92,596 |
| 8 | 5 | 7 | 215,945 | 99,056 |
|   | 6 | 8 | 240,967 | 99,257 |
|   | 8 | 10 | 299,225 | 99,648 |

It is noted that the objective of the present invention method is not to predict specifically future educational costs or investment returns. Rather, it is to look at possible future costs and returns, in relationship to historical experience and current costs. Following the steps outlined above, the calculations of the present invention method provide a base for understanding the potential magnitude of future educational expenses and potential funding requirements. The present invention method may also include additional analysis for generating more specific pricing levels which reflect expenses, death and surrender payments, and investment returns and costs in other particular situations.

Figure 2:
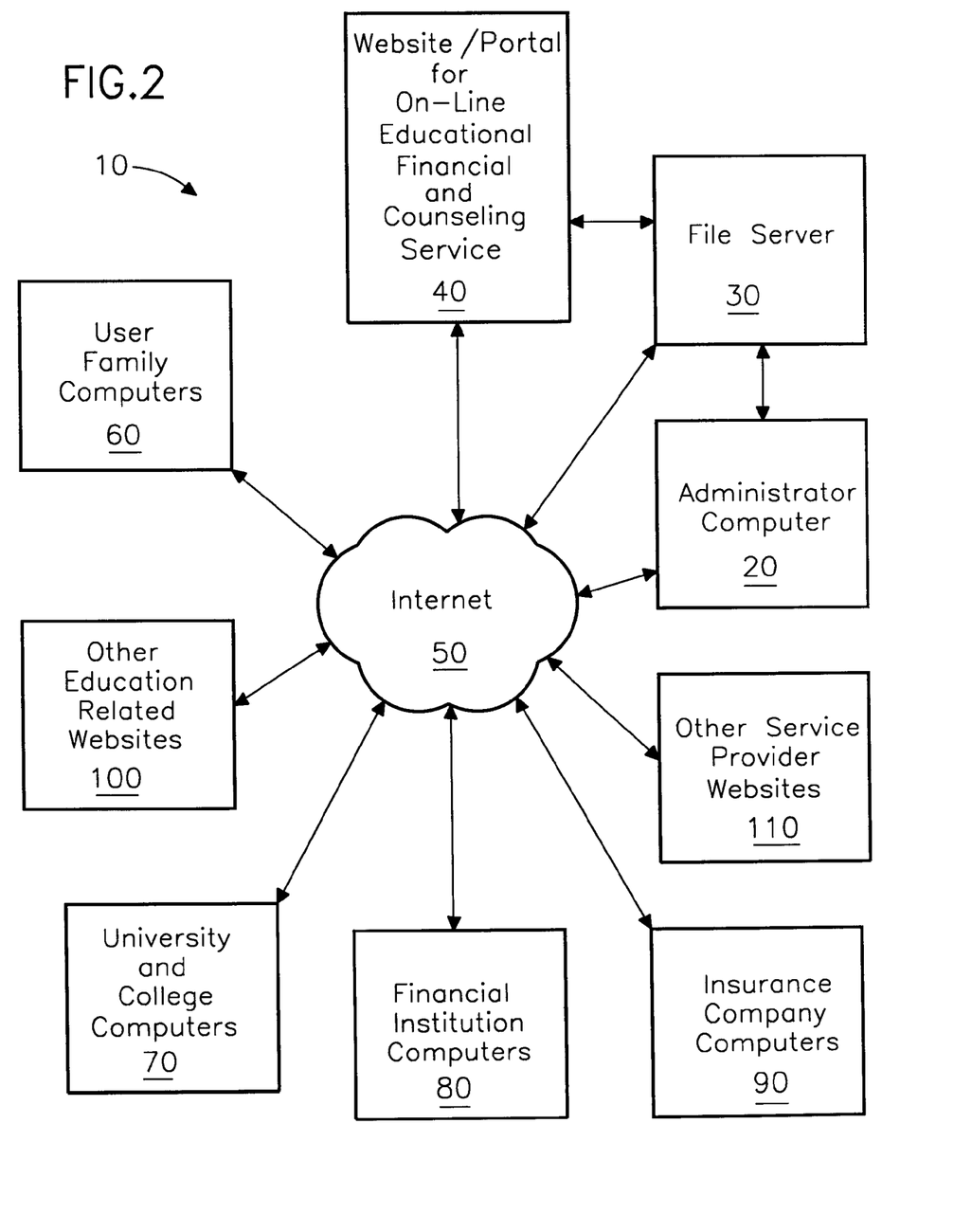
FIG. 2 is a schematic block diagram showing a preferred embodiment of the present invention system for financing expected future educational expenses utilizing the Internet.

Referring to FIG. 2, there is shown a schematic block diagram showing a preferred embodiment of the present invention system for financing expected future educational expenses, providing on-line assistance for educational funding and counseling by utilizing a computer network such as the Internet. The preferred embodiment of the present invention system 10 as shown in FIG. 2 includes a computer 20 used by the administrator of the present invention system, a local or a remote file server 30 for establishing and maintaining a web site 40 on the Internet 50. If it is local server, than it may be the same administrator computer 20. The web site is accessible by consumers through their computers 60 connected to the Internet 50, and linked to other important web sites, including web sites 70 of the universities and colleges, web sites 80 of the financial institutions, web sites 90 of insurance companies, web sites 100 of other educational related products or services, and web site 110 of other general products or services providers.

Figure 3:
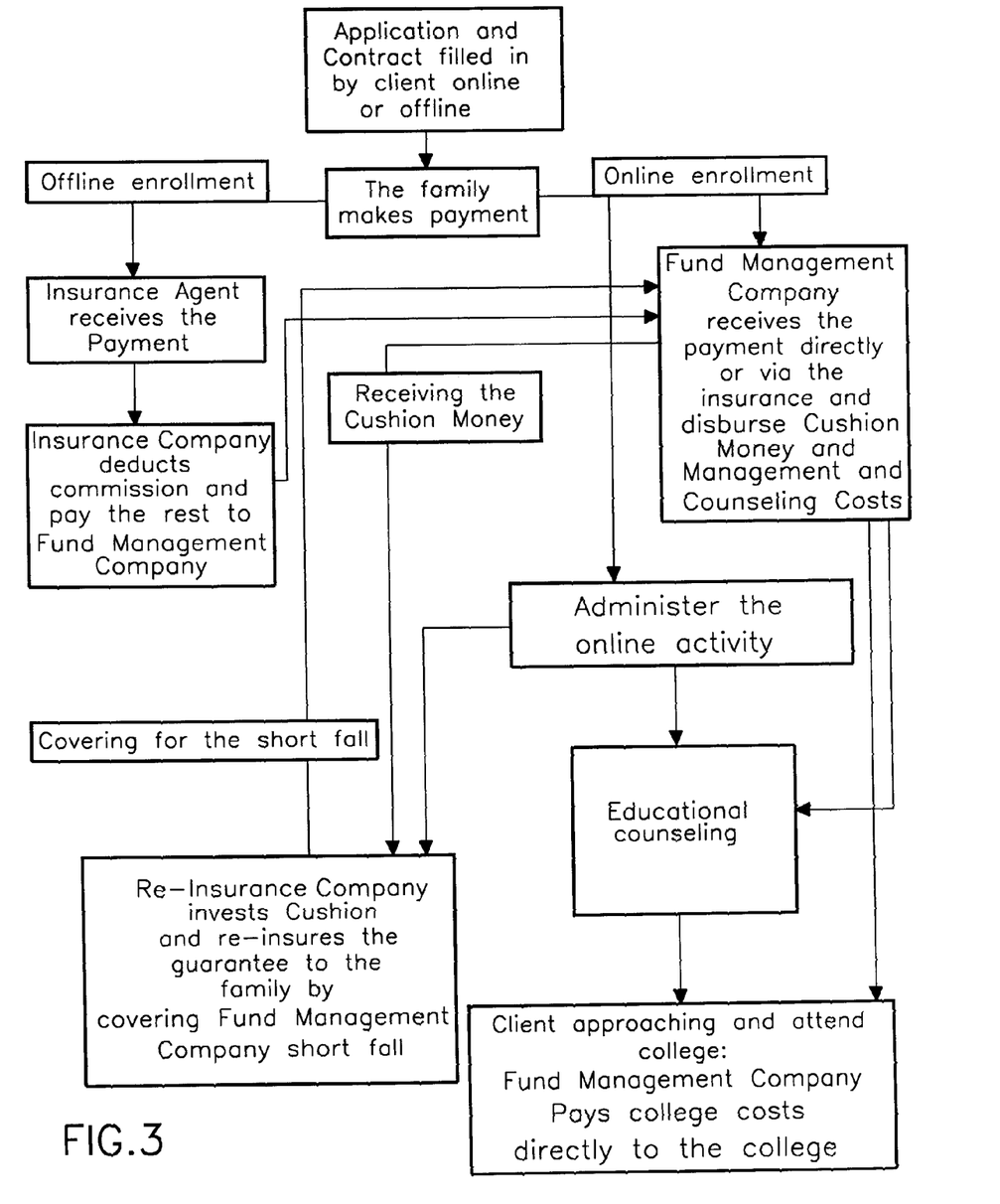
FIG. 3 is a schematic block diagram showing a preferred embodiment of the present invention method and system for financing expected future educational expenses.

The web site 40 may be used for introducing and providing the educational funding and counseling services of the present invention method. Referring to FIGS. 2 and 3 together, an interested customer may be enrolled on-line by filling out an application and related contract. The administrator of the present invention system may conduct on-line administration of the customers' on-line activities, conduct calculations of the present value of future educational costs based on the information and selection provided by the customer.

The calculations are performed by a computer, which may be the file server or the administrator's computer, and which typically includes a central processing unit (CPU), a memory device such as read-only memory (ROM) and/or random access memory (RAM) memory devices, a mass data storage device such as a hard disc drive, and input/output (I/O) devices, which are all operatively connected and adapted to receive inputs and perform calculations based on the programs contained in the memory device and executed by the CPU and database information stored in the data storage device.

The result of the calculation may be delivered back to the customer via the Internet 50. After enrollment and receiving the result of the calculation, the customer may make payment to a financial institution via direct link to the financial institution's web site 80, which link may be provided by the present invention web site 40. When a child in the customer family is ready to attend college or university of his or her choice, the child or his or her guardian instructs the financial institution as to which educational institution the child has selected and then the financial institution will make direct payment to the educational institution. If the child dies before reaching college age or the child decides not to attend college for whatever reason, the family may choose to surrender the contract or policy and receive a lump sum payment. If the child chooses a less expensive college than the benchmark, the child can have the excess money in account for future higher education or take a payout of the difference between the benchmark and the actual payment to the college. However, during the years in between, on-line counseling is provided continuously.

In order to guarantee the future payment of the educational funds, appropriate insurance policies are purchased, covering the short falls of the investment total payout as defined by the total payout benchmark. The premiums of the insurance policies are invested to provide "cushion money" that "re-insures" the guarantee to the customer family by covering the short falls of the original investment total payout. Of course as shown in FIG. 3, the enrollment of the present invention service may be conducted off-line.

Defined in detail, the present invention is a method of financing expected future educational expenses, comprising the steps of: (a) determining current educational expenses; (b) reviewing past changes in educational expenses; (c) calculating future educational expenses based on current educational expenses, past changes in educational expenses, and assumptions on annual increase rates of educational expenses; (d) establishing a target for future total investment payout for total future educational expenses based on calculated future educational expenses, and assumptions on expected investment yields; and (e) deriving present investment amount needed to provide future educational expenses.

Defined broadly, the present invention is a method of financing expected future educational expenses, comprising the steps of: (a) calculating future educational expenses based on current educational expenses, past changes in educational expenses, and assumptions on annual increase rates of educational expenses; (b) establishing a target for future total investment payout for total future educational expenses based on calculated future educational expenses, and assumptions on expected investment yields; (c) deriving present investment amount needed to provide future educational expenses; (d) collecting payment of the present investment amount; and (e) investing the payment to provide funds for payment of the future educational expenses.

Defined more broadly, the present invention is a method of financing expected future educational expenses, comprising the steps of: (a) collecting information from a customer regarding a child's present age and desired educational institution; (b) calculating present investment amount needed to provide future educational expenses, based on total future educational expenses and future total investment payout; and (c) delivering results of calculation to the customer.

Alternatively defined, the present invention is an apparatus for financing expected future educational expenses, comprising: (a) an educational financial and counseling service web site established on the Internet for collecting information from a customer regarding a child's present age and desired educational institution; (b) means for calculating present investment amount needed to provide future educational expenses, based on total future educational expenses and future total investment payout; and (c) means for delivering results of the calculation to the customer.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A method implemented by a provider for providing to a customer means to pay for total future educational expenses to enable the customer's beneficiary to attend any institution of higher learning, said method implemented by said provider comprising the steps of:
   a. determining current educational expenses;
   b. reviewing past changes in educational expenses;
   c. calculating future educational expenses based on current education expenses, past changes in educational expenses, and assumptions on annual increase rates of educational expenses;
   d. establishing a target for future total investment payout for total future educational expenses based on calculated future educational expenses, and assumptions on expected investment yields;
   e. deriving present investment amount needed to provide future educational expenses; and
   f. purchasing by said provider insurance to provide cushion money to cover investment short fall and assure to said customer a guarantee that the total future educational expenses will be paid to attend any institution of higher learning.

2. The method as defined in claim 1, further comprising the step of collecting information from a customer regarding a child's present age and desired educational institution.

3. The method as defined in claim 2, further comprising the step of utilizing a computer network for on-line collection of said information.

4. The method as defined in claim 2, further comprising the step of utilizing a computer network for delivering the result of said calculation to said customer.

5. The method as defined in claim 1, further comprising the step of collecting payment of said present investment amount from a customer to a financial institution for investment.

6. The method as defined in claim 5, further comprising the step of utilizing a computer network for assisting on-line payment of said present investment amount via links to a financial institution's computer.

7. The method as defined in claim 1, further comprising the step of utilizing a computer network for assisting on-line purchase of said insurance policy via links to an insurance company's computer.

8. The method as defined in claim 1, further comprising the step of providing continued educational counseling related to higher education.

9. The method as defined in claim 8, further comprising the step of utilizing a computer network for providing said continued educational counseling.

10. A method implemented by a provider for providing to a customer means to pay for total future educational expenses to enable the customer's beneficiary to attend any institution of higher learning, said method implemented by said provider comprising the steps of:
    a. calculating future educational expenses based on current educational expenses, past changes in educational expenses, and assumptions on annual increase rates of educational expenses;
    b. establishing a target for future total investment payout for total future educational expenses based on calculated future educational expenses, and assumptions on expected investment yields;
    c. deriving present investment amount needed to provide future educational expenses;
    d. collecting payment of said present investment amount;
    e. investing said payment to provide funds for payment of said future educational expenses; and
    f. purchasing by said provider insurance to provide cushion money to cover investment short fall and assure to said customer a guarantee that the total future educational expenses will be paid to attend any institution of higher learning.

11. The method as defined in claim 10, further comprising the step of determining said current educational expenses.

12. The method as defined in claim 10, further comprising the step of reviewing past changes in educational expenses.

13. The method as defined in claim 10, further comprising the step of collecting information from a customer regarding a child's present age and desired educational institution.

14. The method as defined in claim 13, further comprising the step of utilizing a computer network for on-line collection of said information.

15. The method as defined in claim 13, further comprising the step of utilizing a computer network for delivering the result of said calculation to said customer.

16. The method as defined in claim 10, further comprising the step of utilizing a computer network for assisting on-line payment of said present investment amount.

17. The method as defined in claim 10, further comprising a step of providing continued educational counseling related to higher education.

18. The method as defined in claim 17, further comprising the step of utilizing a computer network for providing said continued educational counseling.

19. A method implemented by a provider for providing to a customer means to pay for total future educational expenses to enable the customer's beneficiary to attend any institution of higher learning, said method implemented by said provider comprising the steps of:
   a. providing an educational financial and counseling service web site/portal established on the Internet for collecting information from a customer regarding a child's present age and desired educational institution;
   b. establishing said web site/portal to include a computer accessible via the Internet by said customer, a database for storing said information collected from said customer as well as information collected on current educational expenses and past changes in educational expenses, and a program executed by said computer for calculating present investment amount needed to provide future educational expenses, based on total future educational expenses and future total investment payout, and also based on current educational expenses, past changes in educational expenses, assumptions on annual increase rates of educational expenses and assumptions on expected investment yields;
   c. providing means for delivering results of said calculation to said customer; and
   d. providing means to produce a guaranteed payout at a future date to assure financial ability to pay for total future educational expenses to attend any institution of higher learning.

20. The method as defined in claim 19, further comprising the step of providing means for collecting on-line payment of said present investment amount from said customer.

21. A method implemented by a provider for providing to a customer means to pay for total future educational expenses to enable the customer's beneficiary to attend any institution of higher learning, said method implemented by said provider comprising the steps of:
   a. determining current educational expenses;
   b. reviewing past changes in educational expenses;
   c. calculating future educational expenses based on current educational expenses, past changes in educational expenses, and assumptions on annual increase rates of educational expenses;
   d. establishing a target for future total investment payout for total future educational expenses based on calculated future educational expenses, and assumptions on expected investment yields;
   e. deriving present investment amount needed to provide future educational expenses; and
   f. providing means to produce a guaranteed payout at a future date to assure financial ability to pay for total future educational expenses to attend any institution of higher learning.

22. The method as defined in claim 21, further comprising the step of collecting information from a customer regarding a child's present age and desired educational institution.

23. The method as defined in claim 22, further comprising the step of utilizing a computer network for on-line collection of said information.

24. The method as defined in claim 22, further comprising the step of utilizing a computer network for delivering the result of said calculation to said customer.

25. The method as defined in claim 21, further comprising the step of collecting payment of said present investment amount from a customer to a financial institution for investment.

26. The method as defined in claim 25, further comprising the step of utilizing a computer network for assisting on-line payment of said present investment amount via links to a financial institution's computer.

27. The method as defined in claim 21, wherein said step of providing means to provide a guaranteed future payout at a future date further comprises the step of purchasing insurance to provide cushion money to cover investment short fall and guarantee the payment for future education expenses.

28. The method as defined in claim 27, further comprising the step of utilizing a computer network for assisting on-line purchase of said insurance policy via links to an insurance company's computer.

29. The method as defined in claim 21, further comprising the step of providing continued educational counseling related to higher education.

30. The method as defined in claim 29, further comprising the step of utilizing a computer network for providing said continued educational counseling.

31. A method implemented by a provider for providing to a customer means to pay for total future educational expenses to enable the customer's beneficiary to attend any institution of higher learning, said method implemented by said provider comprising the steps of:
   a. determining current educational expenses;
   b. reviewing past changes in educational expenses;
   c. calculating future educational expenses based on current educational expenses, past changes in educational expenses, and assumptions on annual increase rates of educational expenses;
   d. establishing a target for future total investment payout for total future educational expenses based on calculated future educational expenses, and assumptions on expected investment yields;
   e. deriving present investment amount needed to provide future educational expenses;
   f. purchasing by said provider insurance to provide cushion money to cover investment short fall and assure to said, customer a guarantee that the total future educational expenses will be paid to attend any institution of higher learning; and
   g. providing continued counseling, consultation and services related to higher education.

32. A method implemented by a provider for providing to a customer means to pay for total future educational expenses to enable the customer's beneficiary to attend any institution of higher learning, said method implemented by said provider comprising the steps of:
   a. determining current educational expenses;
   b. reviewing past changes in educational expenses;
   c. calculating future educational expenses based on current educational expenses, past changes in educational expenses, and assumptions on annual increase rates of educational expenses;
   d. establishing a target for future total investment payout for total future educational expenses based on calculated future educational expenses, and assumptions on expected investment yields;
   e. deriving present investment amount needed to provide future educational expenses;

f. providing means to produce a guaranteed payout at a future date to assure financial ability to pay for total future educational expenses to attend any institution of higher learning; and g. providing continued counseling, consultation and services related to higher education.

* * * * *